Dec. 26, 1961 J. C. KENNEDY 3,014,755
GLASS AREA PROTECTIVE MEANS FOR VEHICLES
Filed Sept. 16, 1958 4 Sheets-Sheet 1
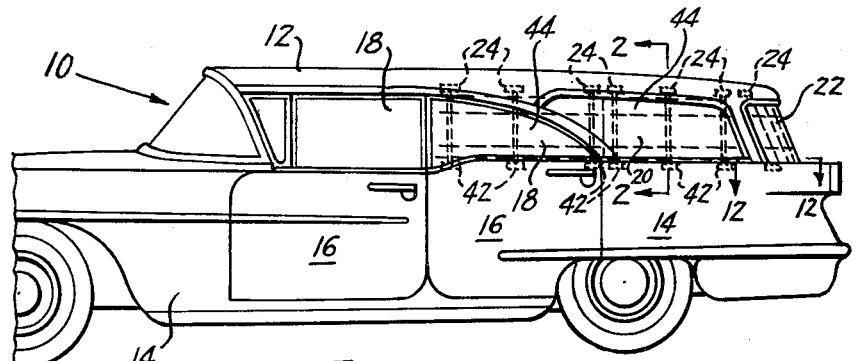
FIG. 1
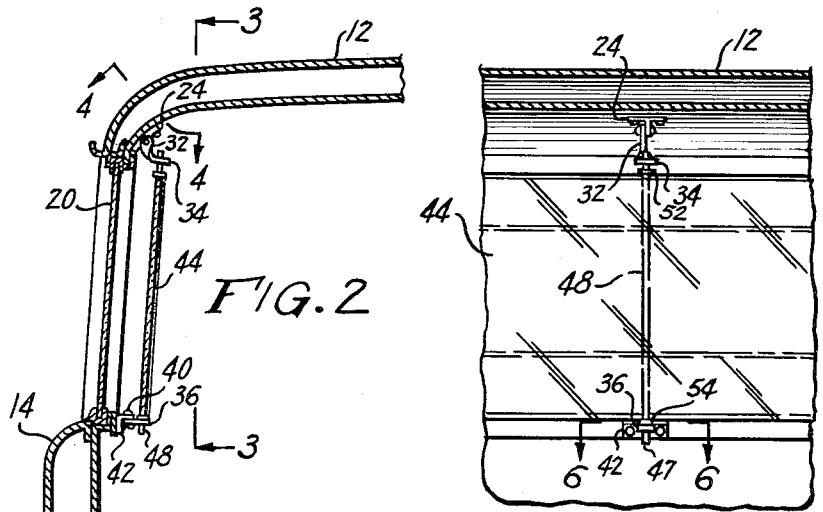
FIG. 2
FIG. 3
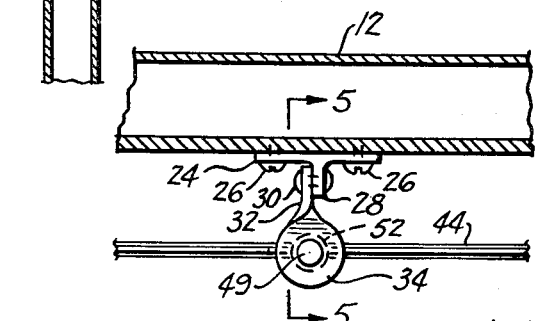
FIG. 4
INVENTOR
JOHN C. KENNEDY
BY Gustave Miller
ATTORNEY Dec. 26, 1961  J. C. KENNEDY  3,014,755
GLASS AREA PROTECTIVE MEANS FOR VEHICLES
Filed Sept. 16, 1958  4 Sheets-Sheet 2

INVENTOR
JOHN C. KENNEDY
BY Gustave Miller
ATTORNEY

INVENTOR
JOHN C. KENNEDY
BY Gustavo Miller
ATTORNEY

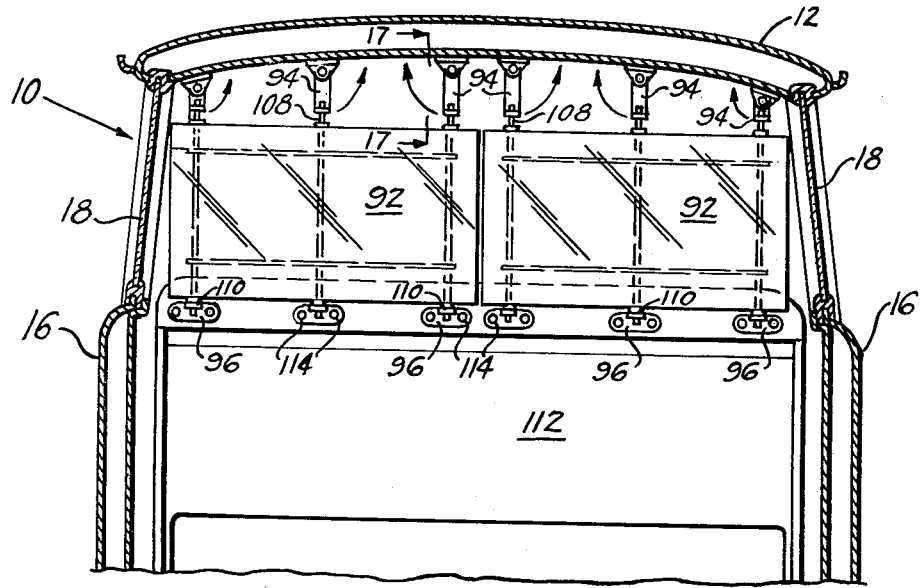
FIG. 16
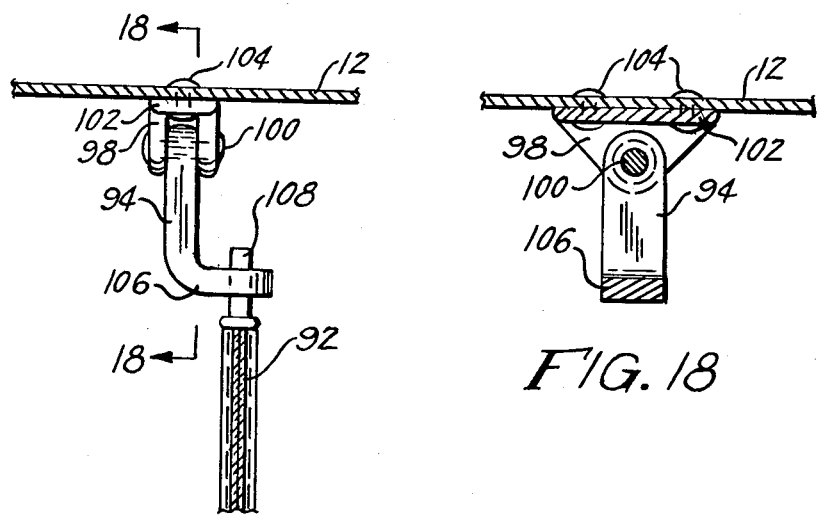
FIG. 17
FIG. 18
INVENTOR
JOHN C. KENNEDY
BY Gustave Miller
ATTORNEY

# United States Patent Office 3,014,755
Patented Dec. 26, 1961

3,014,755
GLASS AREA PROTECTIVE MEANS
FOR VEHICLES
John C. Kennedy, New York, N.Y., assignor to
Gustave Miller, Washington, D.C.
Filed Sept. 16, 1958, Ser. No. 761,382
2 Claims. (Cl. 296—84)

This invention relates to the more complete utilization of storage capacity in automotive vehicles, and it more particularly relates to the adequate utilization of the storage areas in station-wagon type vehicles.

One of the primary reasons for the introduction of the station-wagon type of vehicle was to provide a greater amount of storage capacity than was provided by the trunk compartments of standard type cars. However, the sides and rear of the station-wagon are largely composed of glass; consequently, in order to avoid any possibility of glass breakage due to the motion of the car, owners of such vehicles rarely stack anything above the lower level of the glass area. As a result, the space utilizable as storage area in the station-wagon is little greater than that provided by the trunk compartments of standard type cars, and one of the important reasons for making the station-wagon in the first place, is not realized.

The above problem has heretofore failed of solution because station-wagon owners are generally fond of the appearance of their vehicle and do not wish to cover up or replace the glass windows with any permanent type of non-breakable covering or any temporary protective means which would detract from the appearance of the car.

It is one object of the present invention to overcome the above and other difficulties by providing a protective means for the glass areas of station-wagons which may be easily set in place and removed when desired and which, when set in place, will not detract from the overall appearance of the vehicles.

Another object of the present invention is to provide a protective means of the above type which, when set in place on the vehicle, affords an effective guard against glass damage.

Another object of the present invention is to provide a protective means of the above type which is simple to install and remove and which can be easily and conveniently stored when not in use.

Other objects of the present invention are to provide an improved protective means of the character described, that is easily and economically produced, which is sturdy in construction, and which is highly efficient in operation.

With the above and related objects in view, the present invention consists in the details of construction and combination of parts, as will be more fully understood from the following description, when read in conjunction with the accompanying drawings, in which:

FIG. 1 is a side perspective view of a station-wagon having window-protective means embodying the present invention.

FIG. 2 is a sectional view taken on line 2—2 of FIG. 1.

FIG. 3 is a sectional view taken on line 3—3 of FIG. 2.

FIG. 4 is a sectional view taken on line 4—4 of FIG. 2.

FIG. 16 is a sectional view of the station wagon, looking toward the front end thereof and showing the protective element positioned midway thereof.

FIG. 17 is a view, partly in section and partly in elevation, taken on line 17—17 of FIG. 16.

FIG. 18 is a view, partly in section and partly in elevation, taken on line 18—18 of FIG. 17.

Figure 5:
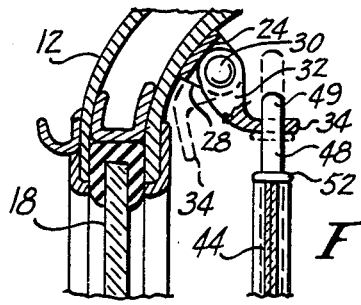
FIG. 5 is a sectional view taken on line 5—5 of FIG. 4.
Figure 6:
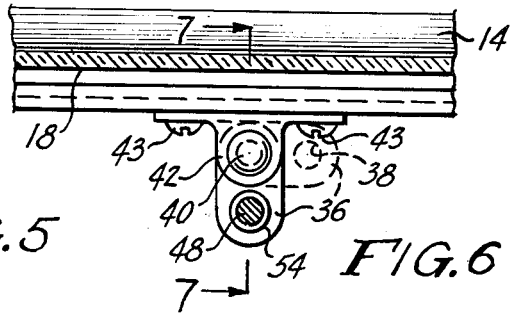
FIG. 6 is a sectional view taken on line 6—6 of FIG. 3.

Referring in greater detail to the drawings, wherein similar reference characters refer to similar parts, there is shown, in FIG. 1, a station-wagon, generally designated 10, including a roof 12 of double wall construction, side walls 14 of similar construction, and doors 16 also of double wall construction.

The doors 16 are each provided with glass windows 18 while the side walls 14 of the vehicle, rearwardly of the doors 16, are provided with glass windows 20. The rear of the vehicle is also provided with a window 22, all in the ordinary manner of station-wagons generally.

The roof 12 is of slightly curved contour, whereby the side edges of the roof extend slightly down in the side plane of the car (as best shown in FIGS. 1, 2 and 5). On the inner wall of these side edges of the roof 12, on either side of the car, are positioned a series of brackets 24. These brackets 24 are each connected to the side edges of the roof 12 by screws or the like indicated at 26 (see FIG. 4) and include an inwardly extending ear 28 apertured to receive a rivet, bolt, pin or the like, 30. This rivet, pin, bolt or the like 30 acts as a pivotal connection between the ear 28 and an extension 32 of a hanger eye 34. By means of this construction, each of the hanger eyes 34 is pivotally adjustable from the operative position (shown in FIG. 4 and in full line in FIG. 5) to the inoperative or storage position shown in dotted outline in FIG. 5.

To coact with the hanger eyes 34, there are provided support fingers 36. These support fingers 36 are provided adjacent the upper edge of the inner wall of each rear door 16 as well as adjacent the upper edge of the rear side wall panel of each side wall 14.

Figure 7:
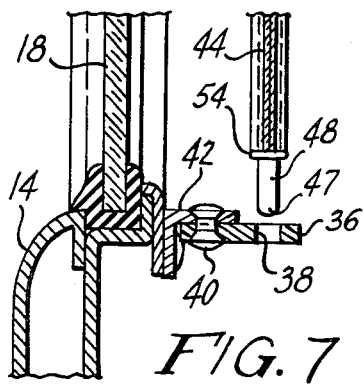
FIG. 7 is a sectional view taken on line 7—7 of FIG. 6.

Each support finger 36 is provided with an aperture 38 to receive the lower end 47 of a support rod 48 (to be hereinafter described) and is pivoted for horizontal adjustment by means of a pivot pin, rivet or the like 40 which connects it to a bracket 42 mounted by means of screws or bolts 43 on the aforesaid upper edge portion of the corresponding door 16 or side wall panel 14. (This construction is best shown in FIGS. 2 and 7). The upper ends 49 of rods 48 are received in the apertures of the hanger eyes 34.

Figure 9:
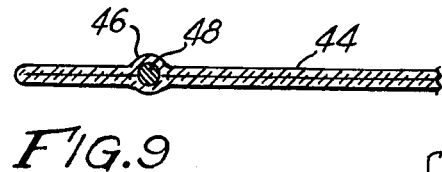
FIG. 9 is a sectional view taken on line 9—9 of FIG. 8.
Figure 10:
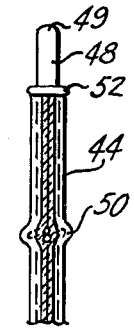
FIG. 10 is a sectional view taken on line 10—10 of FIG. 8.
Figure 8:
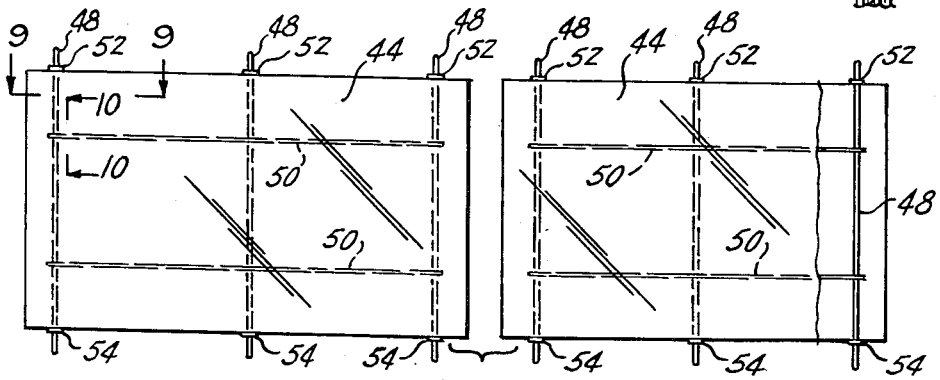
FIG. 8 is a side elevational view showing a pair of protective elements embodying the present invention.

Adapted to be positioned inwardly of the windows 18 and 20 are sheets 44 forming protective covers. These sheets 44 are constructed of flexible material such as heavy canvas, metal, mesh or the like and comprise double plies for increased strength. At spaced intervals, the plies of sheets 44 are oppositely beaded to form transverse channels 46 (best seen in FIG. 9). Positioned in each of these channels 46 is a rod 48, the ends 47 and 49 of which extend out of the channel at either end. For additional strength, transverse reinforcing beads are provided at 50.

Figure 11:
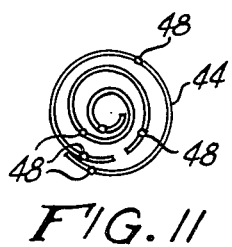
FIG. 11 is an end view of one of the protective elements rolled up in storage position.

When not in use, the sheets 44 may be rolled up either with or without first withdrawing the rods 48 (as indicated in FIG. 11). They may then be easily stored in any accessible position. When they are to be used, they are unrolled, the hanger eyes 34 and support fingers 36 are pivoted into the operative positions (shown in FIGS. 5 and 7) and the upper ends 49 of the rods 48 are inserted upwardly through the apertures in the hanger eyes 34 to permit clearance between the lower ends of the rods 48 and the fingers 36. Then the lower ends 47 of the rods 48 are permitted to drop through the apertures 38 of the fingers 36. In order to protect the material of the sheets 44 and in order to provide rigid stop elements, a metal ring 52 is provided on each of the rods 48 immediately above the material, while a similar ring 54 is provided on each rod 48 immediately below the material. After use, when the sheets 44 are to be stored, the rods 48 are removed from the hanger eyes 34 and fingers 36 in the reverse manner, and the hanger eyes 34 and fingers 36 are then pivoted back out of the way.

The rear of the station-wagon 10 conventionally includes not only windows 22 but also a tailgate 56 which is hinged at its lower edge so that it can be moved into a closed upright position or an open, horizontally extended position. Mounted on each of the side panels of the vehicle, at the rear thereof and just below the level of the tailgate when in closed position, is a socket 58 (see FIG. 13). Into each socket 58 is removably inserted an offset, rounded end portion 60 of a support bar 62 or 64. The offset ends 60 are rotatable in the sockets 58 so that they act as pivot means for horizontal pivotal movement of their respective bars 62 or 64.

The bars 62 and 64 are each provided with a pair of holes, indicated at 66 on bar 62 and 68 on bar 64. Into these holes 66 and 68 are adapted to fit the lower ends of support rods 70. These support rods 70 are similar to rods 48 and are similarly positioned in vertical channels formed in flexible protective cover sheets 72. These sheets 72 are generally identical with sheets 44 and a description of one serves as a description of the other.

The rods 70, after extending through sheets 72, have their upper ends inserted into support bars 74 and 76 which are substantially identical with bars 62 and 64 and are similarly provided with rounded offset end portions 78 rotatably positioned in sockets 78. The rods 70 are also provided with upper and lower rings 79 similar to rings 52 and 54.

Figure 14:
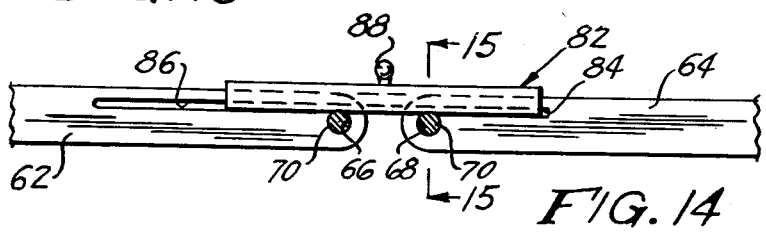
FIG. 14 is a fragmentary elevational view taken on line 14—14 of FIG. 13.
Figure 15:
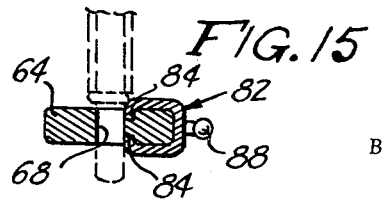
FIG. 15 is a sectional view taken on line 15—15 of FIG. 14.

As best shown in FIGS. 14 and 15, the bars 62 and 64 are releasably locked in position adjacent each other by means of a latch device 82. This latch 82 is a generally rectangular sleeve having three closed sides and a narrow slot in the fourth side (when viewed in cross section as in FIG. 15). The fingers formed at either side of the slot in the fourth side of the sleeve 82 engage in longitudinal grooves 84 and 86 on the upper and lower surfaces of the respective bars 62 and 64. In the assembly of the device, the sleeve 82 is slidably mounted on bar 64 and when the ends of bars 62 and 64 are brought into alignment (as in FIG. 14) the sleeve 82 is slid over the bar 62 to engage its finger portions in grooves 84, whereby the bars 62 and 64 are latched together. A knob 88 is provided on sleeve 82 to act as a handle therefor. A similar latching mechanism is provided for upper bars 74 and 76, this similar latching means being generally designated 90.

Figure 12:
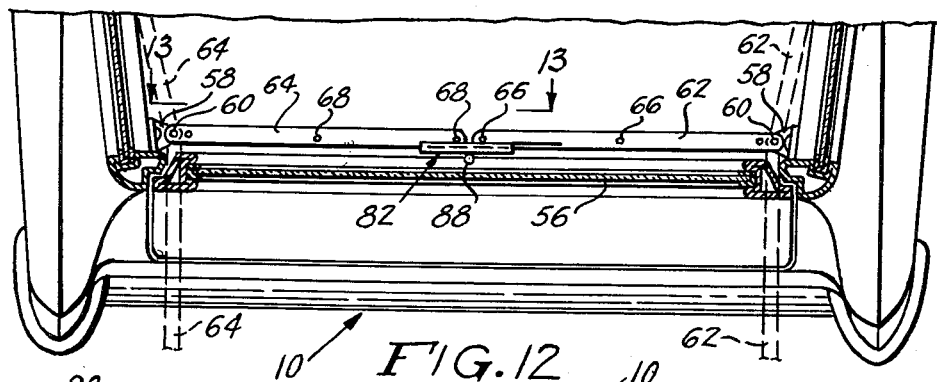
FIG. 12 is a fragmentary horizontal sectional view of the rear portion of a vehicle equipped with apparatus embodying the present invention.
Figure 13:
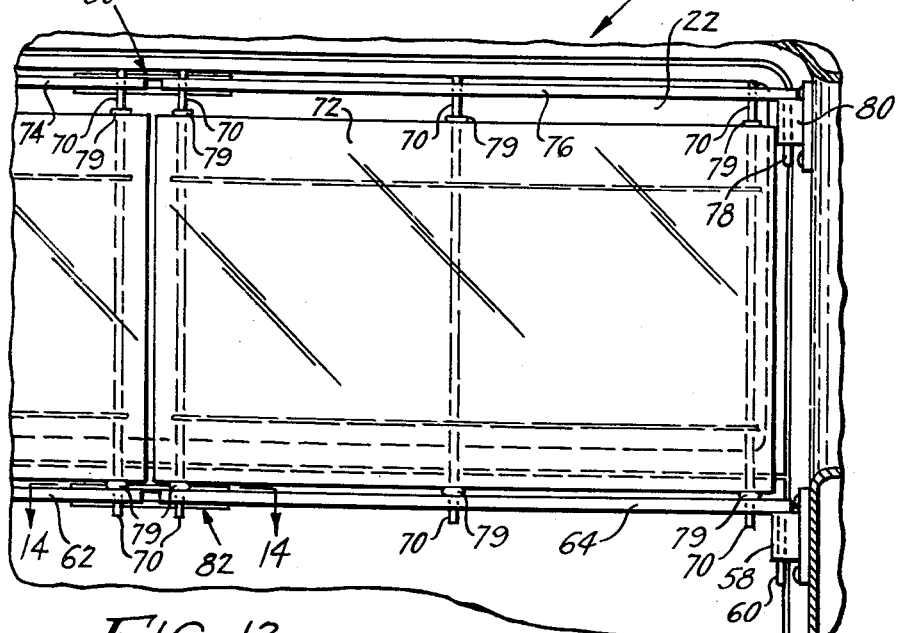
FIG. 13 is a view, partly in section and partly in elevation, taken on line 13—13 of FIG. 12.

By the above type of rear protective cover construction, the upper and lower support bars 62, 64, 74 and 76 act as hinge means whereby the cover sheets 72 can be opened into the positions shown in dotted outline in FIG. 12 (either inwardly or outwardly) or closed into the positions shown in full lines in FIGS. 12 and 13.

Protective cover sheets are also provided within the vehicle between the front and rear portions thereof. This is illustrated in FIGS. 16 to 18 where a pair of cover sheets 92, similar to those shown at 44 and 72, are releasably held in position transversely of the vehicle by means of hanger eyes 94 and support mountings 96.

The hanger eyes 94 vary in size (as shown in FIG. 16) depending on their position relative to the curved roof 12 to the inner wall of which they are connected by means of brackets 98. The brackets 98 each comprise a pair of ears apertured to receive a pivot pin or bolt 100. The brackets 98 each include a plate 102 connected to the wall 12 by pivots or the like 104 while the pivot pin 100 acts to pivotally support the hanger eyes 94. The hanger eyes 94 themselves are each provided with an offset end 106 apertured to receive the upper end of a rod 108 similar to rods 48 and 70.

The lower ends of rods 108 extend into apertured support fingers 110 extending from support mountings 96. The fingers 110 are similar to fingers 36 but mountings 96 are connected to the upper rear surface of the front seat 112 by means of screws, bolts or the like 114.

In operation, the user, when he desires to use the protective covers, removes the rolls of covers from a portable case or the like, sets up the intermediate cover sheets 92 (as shown in FIG. 16) first, then sets up the side cover sheet 44, after which he may load the vehicle up to the roof, if desired, keeping the tailgate open. He then pivots the rear support bars 62, 64, 74 and 76 into operative position, places the covers 72 in position between these bars, and then closes the tailgate. The vehicle is now fully loaded and the glass area thereof is fully protected.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A supporting assembly for cover means for the transparent area of a vehicle, said assembly comprising two pairs of bars, one pair positioned in spaced relationship to the other pair, the bars of each pair being pivotally connected at opposite ends to a supporting means on the vehicle, the bars of each pair being pivotally movable into and out of end-to-end alignment with each other, longitudinal grooves in the bars of each pair aligned with each other when the bars of each pair are in said end-to-end alignment, and releasable latch means coacting with said grooves for holding each pair of bars in said end-to-end alignment.

2. The assembly of claim 1, said latch means including said longitudinal grooves on opposite faces of each bar, and a sleeve constructed to substantially encompass said bars and having fingers slidably engageable in said grooves, said sleeve being slidable from a position solely on one bar to a position wherein it bridges the corresponding ends of both bars.

References Cited in the file of this patent

UNITED STATES PATENTS

| | | |
|---|---|---|
| 1,291,342 | Young | Jan. 14, 1919 |
| 1,509,450 | Sweeney | Sept. 23, 1924 |
| 1,704,157 | Webber | Mar. 5, 1929 |
| 2,187,027 | Harvey | Jan. 16, 1940 |
| 2,546,438 | Grabill | Mar. 27, 1951 |
| 2,715,040 | Rhoads | Aug. 9, 1955 |

(Other references on following page)

UNITED STATES PATENTS

| | | | |
|---|---|---|---|
| 2,757,040 | McLelland | July 31, | 1956 |
| 2,793,050 | Cook | May 21, | 1957 |
| 2,799,530 | Drake | July 16, | 1957 |
| 2,825,326 | Flynn | Mar. 4, | 1958 |
| 2,865,670 | Dunn | Dec. 23, | 1958 |
| 2,884,279 | Halstead | Apr. 28, | 1959 |

FOREIGN PATENTS 1,145,272  France _____ May 6, 1957

OTHER REFERENCES

"Car Window Grill," Popular Science Publication, page 50, February 1957.